United States Patent [19]

Maucher

[11] 3,800,931
[45] Apr. 2, 1974

[54] CLUTCH DISC
[75] Inventor: Paul Maucher, Sasabach, Germany
[73] Assignee: Luk Lamellen Und Kupplungsbau GmbH, Buhl, Germany
[22] Filed: Jan. 18, 1971
(Under Rule 47)
[21] Appl. No.: 107,167

[30] Foreign Application Priority Data
Jan. 17, 1970 Germany............................ 2002039

[52] U.S. Cl............. 192/106.2, 64/27 C, 192/70.17
[51] Int. Cl............................................... F16d 3/14
[58] Field of Search........... 192/106.1, 106.2, 70.17, 192/70.20; 64/27 C

[56] References Cited
UNITED STATES PATENTS

| | | | |
|---|---|---|---|
| 3,223,214 | 12/1965 | Kuivinen............................ | 192/70.17 |
| 2,101,297 | 12/1937 | Swennes............................ | 192/106.2 |
| 3,266,271 | 8/1966 | Stronberg............................ | 192/106.2 |

FOREIGN PATENTS OR APPLICATIONS

| | | | |
|---|---|---|---|
| 959,543 | 1/1963 | Great Britain................... | 192/106.1 |
| 1,200,013 | 2/1968 | Great Britain................... | 192/106.1 |
| 1,212,042 | 7/1968 | Great Britain................... | 192/106.1 |

*Primary Examiner*—Benjamin W. Wyche
*Assistant Examiner*—Randall Heald
*Attorney, Agent, or Firm*—Herbert L. Lerner

[57] ABSTRACT

Clutch disc includes a pair of vibration-absorbing devices disposed in a force-transmitting path between a friction lining carrier and an output part of the clutch disc, and further includes at least one input part and a respective driven part in the form of a hub part provided with teeth for form-lockingly connecting the same with a driving member, and force-storing means located between the input part and the hub part, the input part and the hub part being relatively rotatable in direction opposing biasing action of the force-storing means, the vibration-absorbing devices being connected in parallel.

21 Claims, 8 Drawing Figures

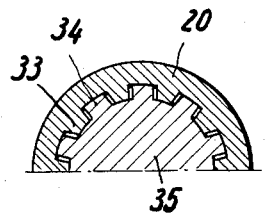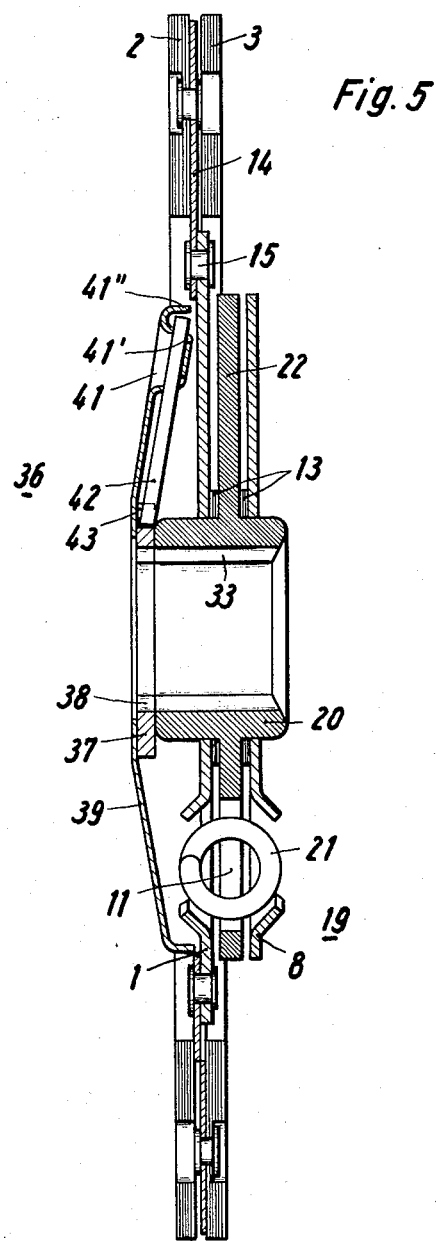

CLUTCH DISC

The invention relates to the so-called damp clutch disc having a pair of vibration-absorbing devices disposed in a force-transmitting path between a friction lining carrier and an output part of the clutch disc, and includes at least one input part and a respective drive part in the form of a hub provided with teeth for form-lockingly connecting the same with a further member such as a transmission shaft, for example, and force-storing means located between the input part and the hub, the input part and the hub being relatively rotatable in direction opposing the biasing action of the force-storing means.

In such clutch discs, as have become known, for example through U.S. Pat. No. 3,414,101, there are provided two damping devices in the force-transmitting path between the friction lining and the output part of the clutch disc with which the clutch disc is mountable on a transmission shaft, the damping devices having a respective driving part in the form of a tooth hub which is located on an intermediate hub having both an outer and an inner profile. One of the two hubs, namely the hub of the so-called predamper is mounted on the profile of the intermediate hub without angular play therebetween, while the hub of the so-called main damper, that is the driving part of the main damper is seated on the intermediate hub fixed against movement in axial direction, yet having play in radial direction. Both hub parts are relatively rotatable with respect to the input parts of each of the dampers in direction opposing the biasing action of force storage means, namely springs, and a friction fit or contact closing is provided between the input parts and the hub. The connection of both dampers to one another is effected by the hub of the main damper firmly on the input part of the predamper by means of bolts or pins, i.e. the two dampers being connected in series.

With such discs, the torque or force line flux extends from the clutch friction linings to the lining carrier (which represents the input part of the main damper) through the springs to the disc-shaped output parts of the main damper and thereby simultaneously to the main hub. From there a torque or force line flux branches off and extends through the input parts of the predamper through springs to the output part of the predamper, namely to the predamper hub. Such discs have a disadvantage in that the action of the predamper ceases as soon as the flanks of the teeth of the main damper hub engage the flanks of the teeth of the intermediate hub. Thus, with such serially connected dampers, the action of the one damper is halted as soon as the other damper is actuated. Such discs have a further disadvantage that the characteristic curve of the damper can be influenced by that of the other damper.

The same disadvantages are inherent in clutch discs of the type disclosed in U.S. Pat. No. 2,745,268 which have two hubs which are located about a transmission shaft, one with and one without play with respect to the transmission shaft. A further disadvantage of clutch discs according to the last-mentioned U.S. patent is that only one spring system is provided for both dampers so that no varying spring characteristic curves are attainable.

There has furthermore been disclosed in German published application DOS 1,425,209 clutch discs with two dampers that are also connected in series. The first damper unit therein is formed of the lining carrier disc provided between two cover discs, the lining carrier disc transmitting the torque through springs to the cover discs. Both cover discs of this damper are firmly connected both to one another as well as to one of the cover discs of a second disc pair, this second cover disc pair of the second damper device being riveted to one another. The flange of the clutch hub is located between the discs of the second cover disc pair, and these cover discs are connected to the flange of the clutch hub through springs. Such clutch discs also have a disadvantage that the torque transmission occurs initially through one of the dampers and then from that damper through the other damper, which requires that each damper must be designed for the total torque that is to be transmitted.

It is accordingly an object of the invention of the instant application to provide clutch disc with a plurality of dampers wherein the different dampers, when rotated from neutral position to stops at different angular location, can be actuated, and the action of all of the dampers is then maintained until the complete rotary range is reached or, in other words, wherein the action of the different dampers is added. It is accordingly unimportant from the standpoint of the inventive concept whether the dampers are actuated successively or whether the actuation of the dampers always is effected simultaneously.

It is a further object of the invention to provide clutch disc of the aforementioned type having a significantly greater range of utility, such as a greater number of possible constructions which permit a significantly finer damping gradation.

With the foregoing and other objects in view, there is provided in accordance with the invention a clutch disc comprising a pair of vibration-absorbing devices disposed in a force-transmitting path between a friction lining carrier and an output part of the clutch disc, and including at least one input part and a respective driven part in the form of a hub part provided with teeth for form-lockingly connecting the same with a driving member, and force-storing means located between said input part and said hub part, said input part and said hub part being relatively rotatable in direction opposing biasing action of said force-storing means, said vibration-absorbing devices being connected in parallel.

Further features of the invention include, for example, that the input parts of the vibration-absorbing devices are rigidly connected to one another or the friction lining carrier is rigidly connected to the input part of each of the vibration-absorbing devices, the friction lining carrier proper being an input part for at least one of the vibration absorbing devices.

With such an embodiment of a clutch disc, the force flux from the lining carrier, in contrast to the heretofore known clutch discs, passes directly to the input parts of the vibration-absorbing devices or vice versa; the force flux, for example, for a skidding automobile extends from the transmission shaft through the vibration-absorbing devices parallel and directly to the friction lining carrier and not, as for the heretofore known discs, first to one and then exclusively over the other of the vibration-absorbing devices. This means therefore that for a relative rotation of both hub parts with respect to the lining or the lining carrier, the action of the one damper is added to the action of the other damper so that for relatively small structures the damping action can be markedly increased as compared to the heretofore known discs.

In accordance with another feature of invention, the damping of the disc can be attained by providing that the hubs of each of the vibration-absorbing devices is nonrotatable relative to one another. Consequently, the damping actions of the individual dampers are added to one another over the entire rotary or angular range of the disc.

In accordance with the features of another embodiment of the clutch disc of the invention, at least one of the hubs of the vibration-absorbing devices is rotatable relative to one another to a specific extent or through a given angle so that the action of the one damper is superimposed upon the action of the other damper only after a predetermined rotary angle. Thereby a clutch disc is produced wherein the different dampers, which can be provided with different torsion and damping characteristic curves, are actuable successively, and the resulting characteristic curve of the damper, for example, starts initially with week torsion and damping action, and both the torsion characteristic as well as the damping action increase progressively over the rotary angle.

The relative rotation of at least one of the hub portions with respect to another can be effected, for example, by the fact that one of the hubs possesses a two-flank play with the inner profile thereof with respect to the profile carrier on which it is seated, such as for example, a transmission shaft, while the other hub of the other vibration-absorbing device is seated thereon or on another profile carrier, substantially relatively nonrotatable thereto.

The invention of the instant application is suitable in a similar manner for discs having more than two vibration-absorbing devices as well as more than two respective hub portions. Thereby, for example, two vibration-absorbing devices operating in one direction and at least one operating in the other direction having respective hub portions are provided, of which at least one is relatively rotatable to the other, these vibration-absorbing devices being connected in parallel with one another, i.e. the input parts of the vibration-absorbing devices being rigidly connected to the friction lining carrier.

In the interest of simplicity, the embodiments specifically disclosed and illustrated in the specificaion relate solely to such clutch discs which have two dampers for both rotary directions and wherein the hub portion of one of the dampers exhibits angular play with respect to that of the other damper, in that for example, the hub portion of one damper is seated with play of the teeth flanks thereof on a profile carrier, while the hub portion of the other damper is seated substantially without any angular play on the same profile carrier.

In accordance with additional features of the invention, the vibration-absorbing device of the one as well as the other damper have force-storing means and/or friction moments of different values, whereby different force-storing means for one and the same vibration-absorbing device can be provided which have different characteristic curves or different response or sensitivity moments or are actuable in accordance with different rotary angles of the hub portion with respect to the corresponding input part. It is also unnecessary in all cases for each of the vibration-absorbing devices to provide a friction moment, but rather it may be sufficient in many cases if one of the vibration-absorbing devices is provided with force-storing means which only exert a reset moment, i.e. have a characteristic curve possessing a substantially small hysteresis or none at all.

In a clutch disc according to the invention wherein the relative rotatability of the hub portions is effected due to angular play of an inner teething provided on the hub portion with respect to corresponding teeth provided on an outer profile member, such as for example, a transmission shaft, there is provided, in accordance with another feature of the invention, a continuous force-locking connection between the relatively nonrotatable hub of one of the dampers with respect to the friction lining carrier in all angular positions thereof by means of force-storing means, such as helical springs, for example, which, on the one hand, engage this hub portion and, on the other hand, engage connecting means or the like, located for example at the input parts of this damper, the input parts being rigidly connected to the friction lining carrier. The one damper is thereby actuable with the relatively nonrotatable hub in all angular positions of the disc. The force-storing means proper may serve as the input parts for at least one of the dampers, the force-storing means being constructed as elongated, rod-like spring elements which are fastened on the one hand to the friction-lining carrier, for example, by rivets or the like, and on the other hand, engage with the other ends thereof in recesses formed in the hub of this damper, and thereby exert a spring force or return spring force.

In accordance with other features of the invention, the force-storing means of one of the dampers are formed of elastic material, for example, of rubber and provide a resilient, damping connection between the hub portion and the friction lining carrier. In a modified form of the invention, the force-storing means comprises at least one radially outwardly directed elongation formed on at least one of the hub portions and resiliently engaged by, or forming resilient parts with, the force-storing means such as helical compression springs, rubber members, or the like, the force-storing means being rigidly connected, on the other hand, with the friction lining carrier.

In accordance with added features of the invention, one or both of the vibration-absorbing devices are subjected to a friction connection. In this respect, that vibration-absorbing device which has a hub portion that is relatively non-rotatable with respect to the outer profile carrier or the transmission shaft, has a frictional connection between the input parts thereof and the hub, the latter proper being in direct engagement with the input parts, for example, friction lining being provided between the input parts and this hub.

The friction connection can also be formed by having the hub parts, that are rotatable relative to one another, in engagement with one another or by disposing a friction lining between the two hub parts.

In accordance with another feature of the invention, a friction connection of such vibration-absorbing devices wherein the hub portion which is relatively nonrotatable to the transmission shaft, for example, is provided with at least one rigid extension which engages with force-storing means secured to the friction lining carrier is effected by having the elongation in engagement with a friction lining fastened to the friction-lining carrier or, contrariwise, the radially outwardly extending elongation can be provided with a friction-lining forming a friction connection in the peripheral direction along the disc in accordance with the angular displacement or rotation of the one hub with respect to the friction lining carrier.

In accordance with a further feature of the invention, the clutch disc is formed with two or more hub portions of respective vibration-absorbing devices which are rotatable relative to the transmission shaft. In this regard it may advantageous for the angular play of both hub portions with respect to the transmission shaft to be of different dimensions.

This feature can be incorporated both in clutch discs wherein only two vibration-absorbing devices are provided and in such clutch discs wherein three or more vibration-absorbing devices are employed, whereby at least one of the respective hub portions is nonrotatable with respect to the carrier of the outer profile such as, for example, the transmission shaft.

In accordance with the another feature of the invention, such clutch discs are constructed that at least individual hub parts are prestressed through the force-storing means coordinated therewith in such manner that the angular play of the hub portion about the outer profile carrier such as as transmission shaft, for example, is possible respective only in one rotary direction, the angular play of the individual hubs, for example, with respect to the transmission shaft, being additionally variable. With such discs, the aforementioned force-storing means and/or friction connections can be used or can be disposed in a similar manner.

It is also obvious that by means of the invention of the instant application an overall large number of possible variations, uses, as well as accommodations for all kinds of vibration problems that may arise can be provided. These advantages are even of greater significance in that it is possible by means of the invention to provide unitary standard discs, at least for given models or classes of construction with, for example, only one damping unit and a respective hub unit, the required subsidiary or auxiliary damper being solely mounted in especially simple manner at the friction lining carrier which, for example, has been previously provided with fastening devices or parts thereof.

Other features which are considered as characteristic for the invention are set forth in the appended claims.

Although the invention is illustrated and described herein as embodied in clutch disc, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing, in which:

FIG. 4 is a sectional view of FIG. 2 taken along the line IV — IV in the direction of the arrows;

FIG. 5 is a cross sectional view of a third embodiment of the clutch disc of the invention taken along the line V — V in FIG. 6;

Figure 1:
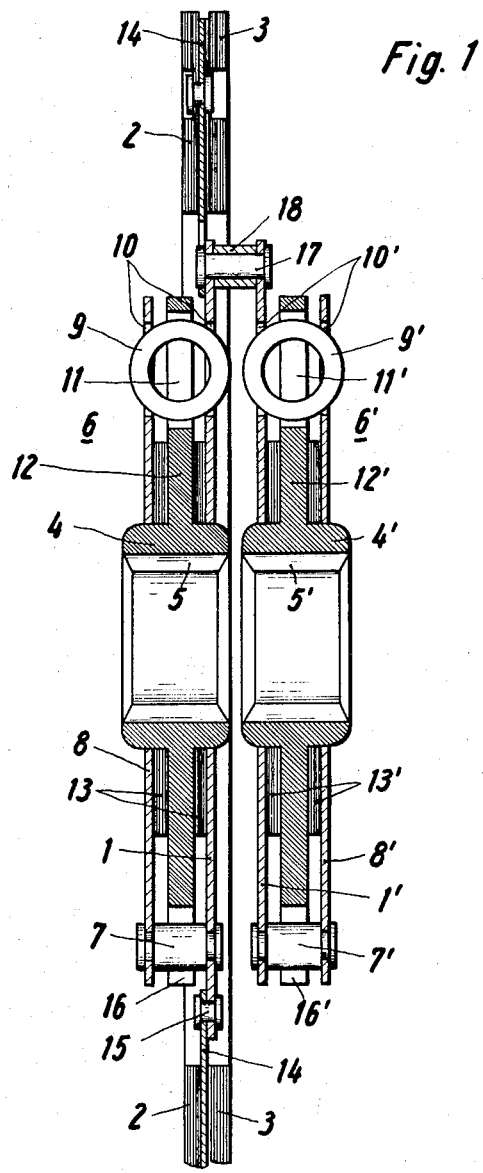
FIG. 1 is a cross sectional view of one embodiment of a clutch disc constructed in accordance with the invention.

Referring now to the drawings and first, particularly, to FIG. 1 thereof, there is shown a clutch disc constructed in accordance with the invention, having two vibration-absorbing devices 6 and 6' disposed in parallel arrangement in the force transmission path between a friction lining carrier 1, on which friction linings 2 and 3 are fastened by rivets, and output parts, namely hub parts 4 and 4'. The vibration-absorbing devices 6 and 6' are of substantially the same construction in the embodiment of FIG. 1 and are formed of disc part pairs 1 and 8, on the one hand, and 1' and 8' on the other hand, that are held together respectively by spacer rivets 7 and 7', and are also formed of helical springs 9 and 9' abutting respectively, on the one hand, end contours 10 and 10' of window-shaped recesses or cut-outs formed in the disc pairs and, on the other hand, end contours 11 and 11' of window-shaped recesses or cut-outs formed within flanges 12 and 12' extending from the respective hubs 4 and 4'.

A friction connection is provided in the form of damping layers or linings 13 and 13' between the input parts 8 and 1, as well as 1' and 8', on the one hand, and the output parts 4 and 4' of both dampers 6 and 6', on the other hand. A prestressing force is applied to these damping linings 13 and 13' in a conventional manner, acting in direction toward the flanges 12 and 12', respectively.

In the embodiment of FIG. 1, the friction linings 2 and 3 are fastened by rivets to known spring segments 14 which are, in turn, secured to the lining carrier 1, the segments 14 being so constructed as to function as lining suspension. For clutch discs with simple dampers, the spacer rivets 7 and 7' of both dampers 6 and 6', respectively, extend radially inside the discs so far that, after being rotated through a given rotary angle relative to the hub flanges 12 and 12', they come into engagement with lateral limiting surfaces 16 and 16' of window-like recesses formed in the hub flanges 12 and 12', respectively.

The parallel connection of both vibration-absorbing devices or dampers 6 and 6' is effected in the embodiment of FIG. 1 by rigidly connecting together the input parts 1 and 1' or the lining carrier 1 and the input part 1' of the damper 6' through a plurality of rivets 17 distributed over the periphery of the parts 1 and 1', spacer sleeves 18 being provided on the rivets 17 for spacing the parts 1 and 1' from one another. The hubs 4 and 4' of the clutch disc are formed with inner teeth 5 and 5', respectively, with which the clutch disc is seated on a non-illustrated drive shaft, the teeth sizes of the hubs 4 and 4' in the embodiment of FIG. 1 being the same. Thus, the torque transmission from the friction linings to the drive shaft and vice versa occurs simultaneously and in parallel through both dampers 6 and 6', in engaged condition of the clutch, from both hubs 4 and 4' through the parallel-connected dampers 6 and 6' simultaneously to the lining carrier 1 and thereby to the linings 2 and 3.

The dampers or oscillation-absorbing devices 6 and 6' can be of completely similar construction i.e. operating in the same manner, as in the embodiment of FIG. 1, or, depending upon the required characteristic curve of the clutch disc, each damper can have springs of varying strength and actuable at varying rotary angles so that by the addition of the differently constructed dampers or different spring valves nearly all the characteristic curves required for clutch discs are attainable with these dampers.

Figure 2:
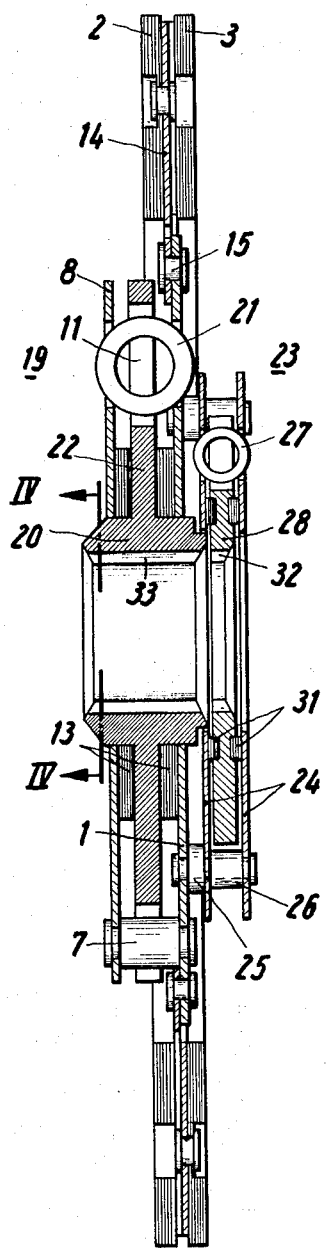
FIG. 2 is a cross sectional view of another embodiment of the clutch disc taken along the line II — II in FIG. 3.
Figure 3:
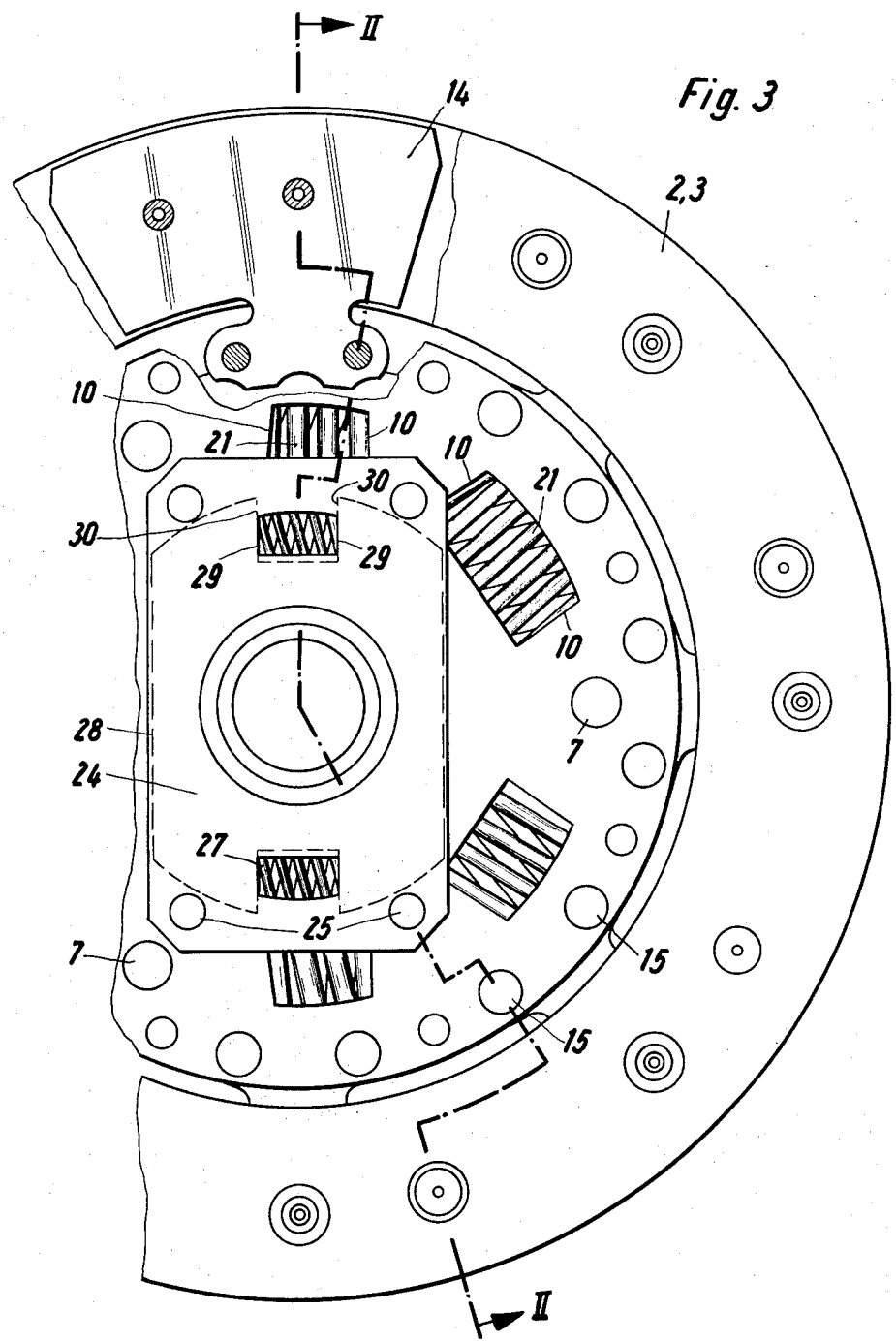
FIG. 3 is an end view of the clutch disc of FIG. 2.

In accordance with a further feature of the invention, however, at least one of the hubs can be rotatable relative to the other, as shown for example in the embodiment of FIGS. 2 to 4, wherein one of the oscillation-absorbing devices or dampers is markedly smaller in dimension than the other and serves as a so-called subsidiary damper for absorbing vibrations of very small amplitudes, such as arise, for example, during the idling of a motor.

As shown in FIGS. 2 and 3, this embodiment of the clutch disc of the invention also has friction layers or linings 2 and 3 which are fastened by rivets to spring segments 14, and the spring segments 14 are in turn fastened by rivets 15 to the lining carrier 1 which forms with the disc 8, as in the embodiment of FIG. 1, the input part for the vibration-absorbing device or damper 19. Force storage devices in the form of helical screws 21 are provided in the force-transmitting path between the input parts 1 and 8 of this damper 19 and the output part, namely the hub 20, as well as a friction connection in the form of damping layers or linings 13 between the hub part 22 and the input parts 1 and 8. The springs 21, which are of different sizes in the embodiment of FIGS. 2 and 3, and are actuated at different rotary angles or angular displacements of the hub 20 relative to the input parts 1 and 8 or the friction linings 2 and 3, are in abutting engagement with terminal edges 10 of recesses or cut-outs formed within the disc parts 1 and 8 and with terminal edges 11 of the recesses or cut-outs formed in the flange 22 of the hub 20; similar to the embodiment of FIG. 1.

Both disc parts 1 and 8 of the embodiment of FIGS. 2 and 3, are connected to one another by spacer rivets 7 in a manner similar to the embodiment of FIG. 1.

The second or subsidiary damper 23 of the embodiment of FIGS. 2 and 3 is formed of plate-shaped input parts 24 which are securely riveted by spacer rivets 25 and respective spacer sleeves 26 mounted thereon to the lining carrier 1, i.e. to the input part of the damper 19. Springs 27 provide a constant force-locking connection between the input parts 24 of the damper 23 and the respective hub part 28, in that they abut, on the one hand, terminal edges 39 of window-shaped recesses or cut-outs formed in the input parts 24 and, on the other hand, terminal edges 30 of recesses or cut-outs formed in the hub part 28. A friction connection is provided through damping rings 31 between the input parts 24 of the damper 23 and the hub part 28.

The hub 28 is seated with the teeth 32 thereof meshing in suitably provided teeth formed in a non-illustrated transmission shaft so that the hub 28 is radially fixed relative to the transmission shaft yet axially displaceable with respect thereto. Radial play is provided however, between the flanks of the teeth 33 of the hub part 20 and the flanks of the teeth formed on the non-illustrated transmission shaft so that both hub parts 20 and 28 are rotatable relative to one another. This detail of construction is apparent from FIG. 4 of the drawings wherein there is shown that angular play is provided between the teeth 33 of the hub 20 and the teeth 34 of a transmission shaft 35. Due to this angular play, or irregular alternating vibrations, which occur during idling operation of a motor and which primarily lie in the order of magnitude of ±3° to ±4°, are able to be absorbed by the damper 23 so that such vibrations can be absorbed generally with relatively slight resistance and cannot be transmitted through the main damper 19 and the lining carrier 1 to the friction linings 2 and 3 and thereby to the after-connected transmission. The shift or displacement of the teeth flanks, which are produced by such small vibrations and which produce a distinctly audible sound and premature wear, cannot therefore occur any longer.

The moment, however, that the angular play between the teeth 34 of the transmission shaft 35 and the teeth 33 of the hub 20 is overcome by the torque that is to be transmitted and the damper 19 is actuated, the action of the damper 23 with the characteristic curve thereof, is additionally superimposed on the action of the damper 19 and remains fully and additionally effective over the entire rotary or angular range of the damper 19.

A further embodiment of the clutch disc of the invention is shown in FIGS. 5, 6 and 7 and again includes a main damper 19 which operates in a manner similar to that of FIG. 2. Similarly functioning parts in the embodiments of FIGS. 2 and 5 are identified by the same reference numerals.

Figure 6:
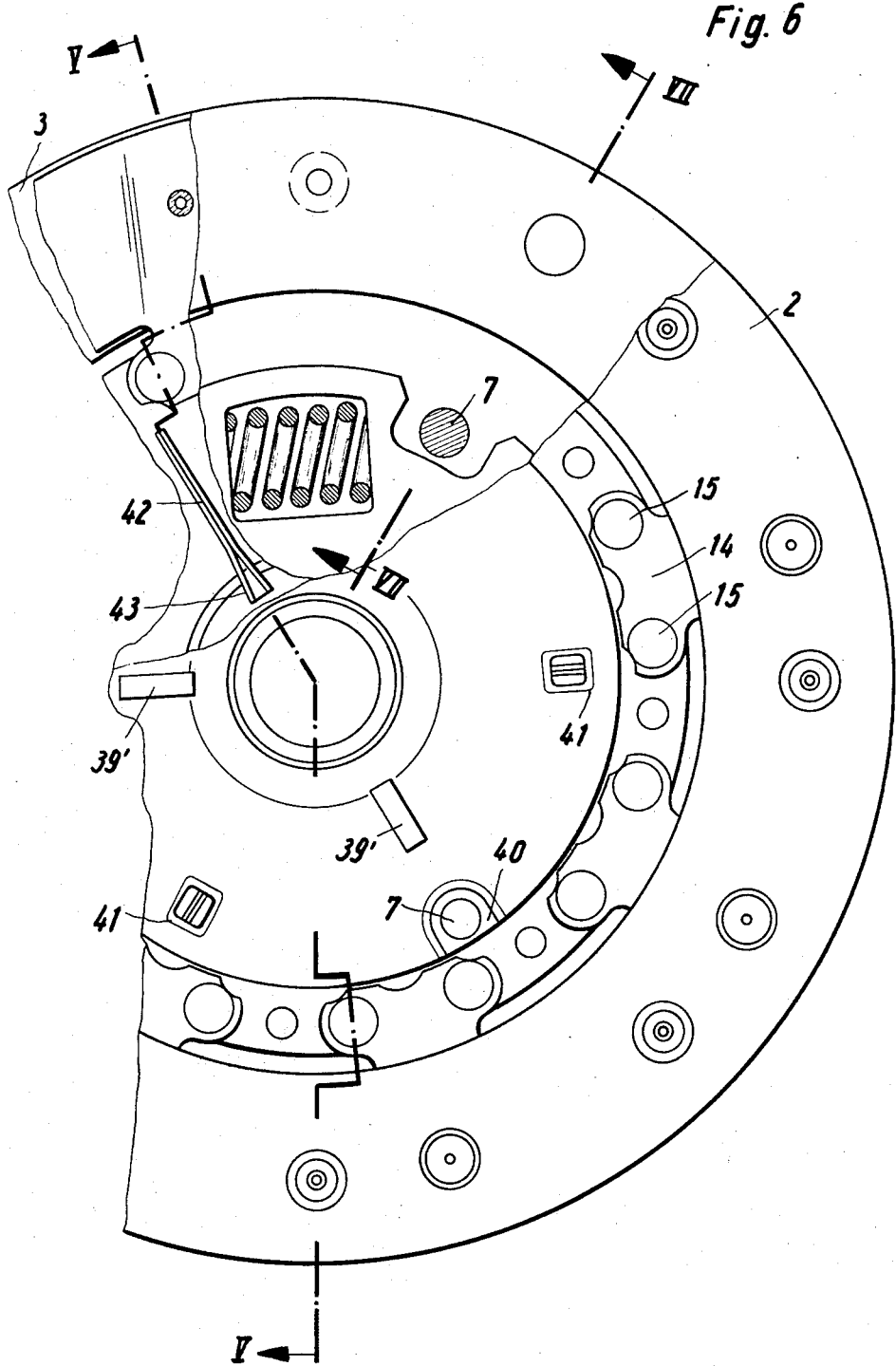
FIG. 6 is an end view of the clutch disc of FIG. 5.
Figure 7:
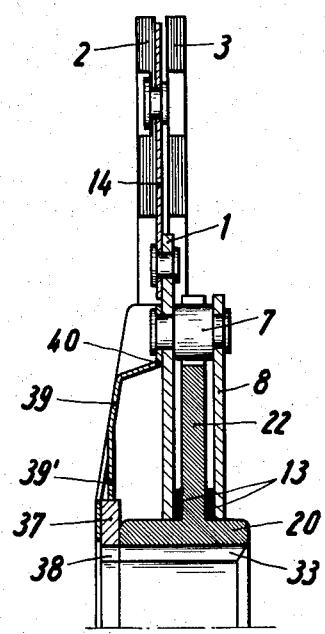
FIG. 7 is a sectional view of FIG. 6 taken along the line VII — VII in the direction of the arrows.

The clutch disc of FIGS. 5, 6 and 7 has a damper 36 connected in parallel with the damper 19 and provided with a hub 37 which is seatable with teeth 38 thereof on a non-illustrated transmission shaft having suitable teeth meshing therewith without angular or rotary play therebetween. A sheet-metal casing 39 is formed with indentations 40 distributed over the periphery thereof and is firmly connected by spacer rivets 7 with the friction lining carrier 1 i.e. with the input part of the damper 19, the sheet-metal casing 39 thus forming the input part for the damper 36. Further indentations 41, in fact three in number, are distributed over the periphery of the sheet-metal casing 39, and springy rods or leaf springs 42 are inserted in slots 41' suitably formed in the indentations 41, the rods or leaf springs 42 being prevented from sliding out of the slots 41' in radial direction by a surrounding flange 41'' provided on the casing 39. The end of the leaf springs 42 located distant from the flange 41'' engage in groove-shaped recesses 43 formed in the hub 37. The leaf springs 42 exert a return spring force on the hub 37 during idling operation, as do the springs 27 of the embodiment of FIGS. 2 and 3. As soon as the torque to be transmitted exceeds the play of the teeth flanks of the main hub 20 with respect to the corresponding teeth provided on the non-illustrated transmission shaft (note: FIG. 4), the characteristic curve of this damper 36 is superimposed on that of the damper 19 over the entire angular or rotary range thereof and thereby reinforces the action of the damper 19.

A friction connection of the damper 36 is produced in the case of the embodiment of FIGS. 5, 6 and 7, in that the hub 37 has a friction fit both at the part 39 as well as at the hub 20. Friction layers or linings can also, however, be disposed at one or both sides of the hub 37 in order to produce a friction connection.

In order to center the hub 37, three stamped-out lugs 39' are provided in the sheet-metal casing 39 of the embodiment of FIGS. 5, 6 and 7 and engage the periphery of the hub 37 thereby accurately centering the latter.

Figure 8:
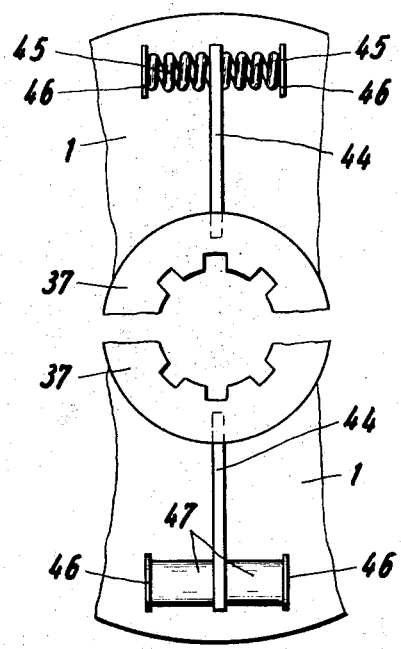
FIG. 8 is a fragmentary end view of a modified form of the clutch disc of FIG. 7.

The springing or damping of the subsidiary damper 36, as aforementioned and as shown in FIG. 8, is attainable by providing an arm or cantilever 44 fixed at one end to the hub 37 and engaging at the other end thereof at one end of springs 45 whose other ends abutting a respective stop 46 located on the friction lining carrier 1. On the other hand, as shown in the lower part of FIG. 8, the cantilever arms 44 can engage respective ends of members 47 formed of elastic material such as rubber, for example, and which are firmly connected, for example, through respective stops 46 to the friction lining carrier i.e. paralled therewith.

As aforementioned, the invention is not limited to the described and illustrated embodiments. Thus, for example, the clutch disc of the invention may be provided with more than two dampers, at least two of the dampers being rotatable relative to the transmission shaft, and being additionally prestressible through force storing devices thereof so that the angular or rotary play of the hub parts about the transmission shaft is possible respectively only in one rotary direction. I claim:

1. Clutch disc comprising a pair of vibration-absorbing devices disposed in a force-transmitting path between a friction lining carrier and an output part of the clutch disc, each of said vibration-absorbing devices including at least one input part and a separate hub part each provided with teeth for form-lockingly connecting the same with a profiled member, one of said hub parts having means cooperable with said profiled member to provide for rotation of said one hub part relative to the other hub part, and force-storing means located between each of said input parts, and its respective hub part, said input parts and said hub parts being relatively rotatable in a direction opposing biasing action of said force-storing means, and means connecting said vibration absorbing devices in parallel.

2. Clutch disc according to claim 1 wherein each of said vibration-absorbing devices has input parts that are rigidly connected to one another by said connecting means.

3. Clutch disc according to claim 1 wherein said friction lining carrier is an input part of one of said vibration absorbing devices.

4. Clutch disc according to claim 1 including more than two vibration-absorbing devices each having parts, and each having input parts that are connected to said friction lining carrier.

5. Clutch disc according to claim 1 wherein said vibration-absorbing devices have force-storing means of different strength.

6. Clutch disc according to claim 1 wherein said vibration-absorbing devices have friction moments of different values.

7. Clutch disc according to claim 1 wherein each of said input parts of said vibration-absorbing devices form abutment for said force-storage means.

8. Clutch disc comprising a pair of vibration-absorbing devices disposed in a force-transmitting path between a friction lining carrier and an output part of the clutch disc, each of said vibration-absorbing devices including at least one input part and a respective driven part in the form of a separate hub part each provided with teeth for form-lockingly connecting the same with a driving member, one of the hub parts of said pair of vibration-absorbing devices having means cooperable with said driving member to provide for rotation of said one hub part relative to the other hub part and force-storing means located between each of said input parts and its respective hub part, said input parts and said hub parts being relatively rotatable in a direction opposing biasing action of said force-storing means, and means connecting said vibration absorbing devices in parallel.

9. Clutch disc according to claim 8 wherein the other of said hub parts is non-rotatable relative to said driving member, the vibration-absorbing device for said other hub part having input parts, and including a friction connection between said non-rotatable other hub part and said last-mentioned input parts.

10 Clutch disc according to claim 9 wherein said friction connection comprises friction linings engaging said hub part, on the one hand, and said input parts, on the other hand.

11. Clutch disc according to claim 8 including a friction connection between said relatively rotatable hub parts.

12. Clutch disc according to claim 1 wherein said force-storing means comprises a spring for at least one of said vibration-absorbing devices.

13. Clutch disc according to claim 1 including a damper of elastic material located between said hub part and said friction lining carrier.

14. Clutch disc according to claim 1 wherein said force-storing means proper forms an input part of one of said vibration-absorbing devices.

15. Clutch disc according to claim 3 and wherein said force-storing means are located between said friction lining carrier and said hub part and comprise elongated spring members exerting, on the one hand, a return spring force on said hub part and being pivotable, on the other hand, relative fixed points at said friction lining carrier.

16. Clutch disc according to claim 1 wherein said hub part is formed with at least one radially outwardly directed extension against which said force-storing means engages.

17. Clutch disc comprising a pair of vibration-absorbing devices disposed in a force-transmitting path between a friction lining carrier and an output part of the clutch disc, each of said vibration-absorbing devices including at least one input part and a respective driven part in the form of a separate hub part each provided with teeth for form-lockingly connecting the same with a driving member, said hub parts of said pair of vibration-absorbing devices being provided with means cooperable with said driving member to provide for rotation of said hub parts relative to said driving member, and force-storing means located between each of said input part and its respective hub part, said input parts and said hub parts being relatively rotatable in a direction opposing biasing action of said force-storing means, and means connecting said vibration absorbing devices in parallel.

18. Clutch disc according to claim 17 wherein said hub parts are rotatable through angles of different sizes about said driving member.

19. Clutch disc according to claim 17, wherein said hub parts are rotatable only in one rotary direction.

20. Clutch disc comprising a pair of vibration-absorbing devices disposed in a force-transmitting path between a friction lining carrier and an output part of the clutch disc, and including at least one input part and a respective driven part in the form of a hub part provided with teeth for form-lockingly connecting the same with a profiled member, and force-storing means located between said input part and said hub part, said input part and said hub part being relatively rotatable in direction opposing biasing action of said force-storing means, said vibration-absorbing devices being connected in parallel one of said hub parts being formed with inner teeth meshable with play with corresponding teeth formed on said profiled member whereby said one hub part is rotatable relative to the other hub part, said other hub part being relatively non-rotatable with respect to said other profiled member and having a continuous force-locking connection with said friction lining carrier in all angular positions thereof.

21. Clutch disc comprising a pair of vibration-absorbing devices disposed in a force-transmitting path between a friction lining carrier and an output part of the clutch disc, each of said vibration-absorbing devices including at least one input part and a respective driven part in the form of a separate hub part each provided with teeth for form-lockingly connecting the same with a driving member, and force-storing means located between each of said input part and its respective hub part, and friction means between at least one of said input parts and its respective driven part, said friction means acting simultaneously and in parallel with the action of the force-storing means associated with said at least one input part, said input parts and said hub parts being relatively rotatable in a direction opposing biasing action of said force-storing means, and means connecting said vibration absorbing device in parallel.

* * * * *